Jan. 15, 1963 W. L. MANN 3,073,134
VARIABLE LENGTH PIPE
Filed March 21, 1960

INVENTOR.
WILLIAM L. MANN
BY
*Elliott & Pastoriza*
ATTORNEYS

Patented Jan. 15, 1963

3,073,134
VARIABLE LENGTH PIPE
William L. Mann, 2245 E. Foothill Blvd.,
Pasadena, Calif.
Filed Mar. 21, 1960, Ser. No. 16,452
4 Claims. (Cl. 64—23)

This invention relates generally to a variable length pipe and more particularly, to an improved telescoping pipe structure designed in its preferred embodiment for use in an oil well drill pipe string. While the present invention will be described with respect to drilling operations, it should be understood that its use is not limited to this field, but may be used with drill collars, mandrels, torque shafts or axles.

There are many instances in which a variable length drill pipe is useful in drilling operations. For example, in deflection drilling employing deflecting apparatus such as described in my co-pending application Serial No. 15,294 filed March 16, 1960, the degree of deflection of the drilling is determined in part by the length of pipe section between a flexible joint used in conjunction with the deflecting apparatus and the drill bit. By employing pipe section the length of which can be controlled from the surface, the degree of deflection can be controlled without the necessity of pulling the pipe string to substitute in pipe sections of different lengths.

In straight drilling operations, one or more variable length pipe structures connected in series in the drill pipe string would enable straight drilling to continue for longer periods before additional drill pipe is attached. In fact, the drilling could be continued until the bit had to be changed. At this point, the pipe string could be withdrawn to change the bit and additional pipe sections inserted before the drilling was again started. Thus, the extra crew of men ordinarily required for periodically inserting pipe sections to increase the overall length of the pipe string, would be required far less frequently, to the end that considerable savings in time and labor could be achieved in the overall drilling operation.

In order to provide a variable length pipe made up of telescoping sections which will also communicate a rotating torque therethrough when in any particular set position defining a given length, some type of splined or other equivalent structure has been thought necessary so that sliding movement of the telescoping portions can be effected with the portions themselves locked against relative rotation with respect to each other. If mud pressure is used to actuate the structure, sealing of the engaging splined surfaces is extremely difficult because of the relatively sharp corners defined by the splines or equivalent structures which destroy conventional type sealing O-rings. As a consequence, the use of an hydraulically controlled system for retaining the telescoping pipe sections in a given relationship with each other cannot easily be achieved by structures proposed heretofore.

With the foregoing in mind, it is a general object of this invention to provide an hydraulically actuated variable length pipe.

More particularly, it is an object to provide a variable length drilling pipe or sub in which the overall length thereof may be varied from the surface of the bore hole to the end that the length of the drill pipe string or any portion thereof may be changed without the necessity of pulling the pipe to substitute different length pipe sections or without the necessity of adding drilling pipe to the upper end of the drill pipe string at the surface as frequently as is presently required.

Another object is to provide a variable length pipe in which rotation of the sections making up the pipe is effected as a unit regardless of the particular set length of the pipe so that conventional rotary drilling can be carried out with the variable length pipe constituting a part of the drill string.

Still another important object is to provide a variable length drilling pipe which can withstand relatively high axial forces and in which the length of the pipe can be varied hydraulically so as to be operable from the surface of the bore hole without leakage about the movable parts of the pipe.

Briefly these and many other objects and advantages of this invention are attained by providing first and second pipe sections in telescoping relationship with each other. Each of the pipe sections includes portions defining a fluid receiving chamber so that introduction of fluid into the chamber under pressure will telescope the pipe sections apart to increase their overall length. In accordance with an important feature of the invention, the sections are locked against relative rotational movement with respect to each other by providing oval shaped cross sections for the telescoping portions. By this arrangement, conventional sealing O-rings may be employed since the engaging telescoped surfaces of the pipe sections are smoothly curved about their circumferences.

Suitable inlet and outlet check valves are respectively provided between the interior of the pipe sections and the fluid receiving chamber, and the fluid receiving chamber and exterior of the pipe sections. By using check valves adjusted to operate only when given pressures are exceeded, the pipe sections may be held in any particular telescoped position by the hydraulic fluid within the chamber.

A better understanding of the invention as well as further features and advantages thereof will be had by now referring to a preferred embodiment thereof as illustrated in the accompanying drawings, in which.

Figure 1:
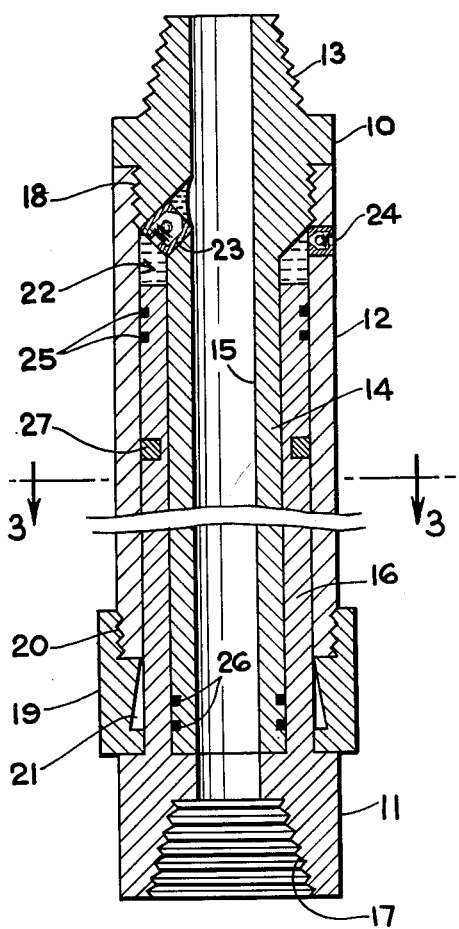
FIGURE 1 is a cross section of the variable length drilling pipe in fully contracted position.
Figure 2:
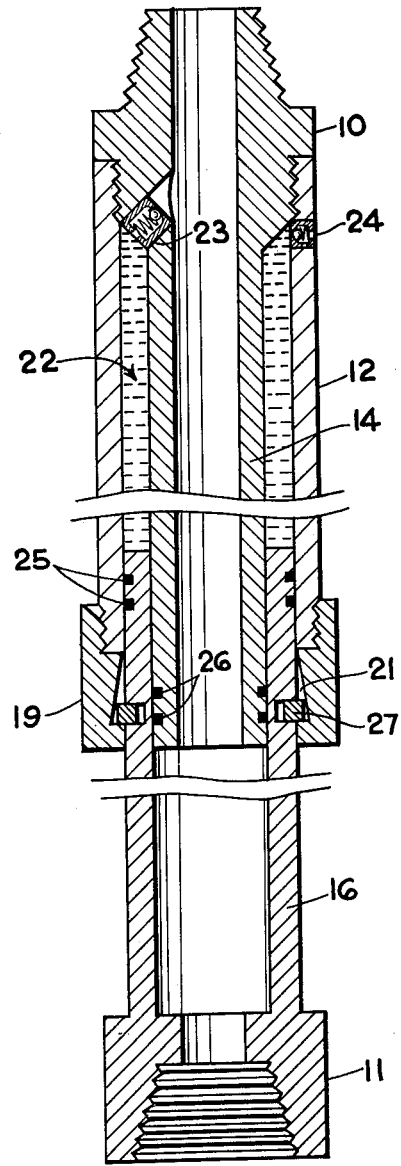
FIGURE 2 is a cross section similar to FIGURE 1 illustrating the variable length drilling pipe in its fully extended position; and, FIGURE 3 is a cross section taken in the direction of the arrows 3—3 of FIGURE 1.

Referring to FIGURES 1 and 2, the structure basically comprises first and second pipe sections 10 and 11 telescoped together with their telescoping portions surrounded by a sleeve 12. As shown, the pipe section 10 terminates at its upper end in a threaded coupling 13 and includes a reduced diameter portion 14 extending to its other end. A central mud passage 15 passes through the center of the pipe section. The second pipe section 11 in turn includes a lesser reduced diameter portion 16 receiving the portion 15 in telescoping relationship, and terminates at its lower end in a threaded coupling 17.

In the particular embodiment chosen for illustrative purposes, the sleeve 12 is threadedly secured at 18 to the first pipe section 10. The lower end of the sleeve 12 is provided with an annular stop collar 19 threadedly secured thereto as at 20. The inner wall of the collar 19 is flared radially in a direction towards the lower end of the reduced diameter portion 14 to define an annular cavity 21. This cavity forms a flared continuation of an annular fluid receiving chamber 22 defined between the exterior wall of the reduced diameter portion 14 of the first pipe section 10 and the interior wall of the sleeve 12 as best shown in FIGURE 2.

The annular fluid receiving chamber 22 communicates with the interior mud passage bore 15 of the first pipe section 10 through an inlet check valve 23. This annular chamber also communicates with the exterior of the pipe section and sleeve 12 through an output check valve 24. The check valves 23 and 24 are spring loaded to open only under given pressures.

Proper sealing of the telescoping portions of the pipe sections are accomplished by pairs of O-rings 25 on the upper exterior portion of the lesser reduced diameter section 16 for the second pipe section 11 and pairs of O-rings 26 on the lower end portion of the first-mentioned reduced diameter section 14. The O-ring seals are preferably Teflon backed so as to enable them to withstand high pressures.

In order to limit the extreme telescoping extent of the second pipe section 11 from the first pipe section 10, the annular flared cavity 21 of the stop collar 19 is arranged to co-operate with an encircling expanding stop ring 27 keyed to the exterior of the lesser reduced diameter portion 16 of the second pipe section 11. The expandable ring 27 is arranged to be received within the cavity 21 to serve as a stop when the pipe section 11 is telescoped to its maximum extent from the pipe section 10 as shown in FIGURE 2 and as will become clearer when the operation of the device is described.

Figure 3:
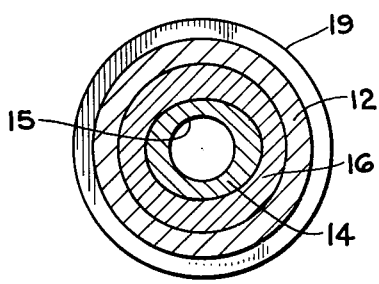

Referring to FIGURE 3, it will be noted that the exterior of the reduced diameter portion 14 of the first pipe section 10 as viewed in cross-section follows a smooth non-circular closed curve. Similarly, the inner wall of the lesser reduced diameter portion 16 of the second pipe section 11 follows a congruent non-circular closed curve. Preferably, the shape is oval so that the O-rings 26 will be subject to minimum distortion. By this arrangement, the pipe sections 10 and 11 are locked against rotation relative to each other and yet can move axially in a longitudinal direction relative to each other with proper sealing between the sections.

The operation of the overall device will be evident from the foregoing description. The pipe sections 10 and 11 are initially in their retracted position shown in FIGURE 1. Spring loading of the check valves holding the chamber 22 closed unless predetermined pressures are exceeded, insures that the members remain in this position. The threaded couplings 13 and 17 respectively correspond to the conventional threads on the drill pipe employed in the conventional string so that one or more of the variable pipe sections may be connected to each other or in series in the drill pipe string.

Assuming that the particular operation to be performed is a deflection drilling employing apparatus of the type described in my co-pending application Serial No. 15,294 filed March 16, 1960, the variable length section is attached between the flexible joint coupling from the deflection tool and the drill bit. Deflection drilling may then start. If the rate of deflection is too great, the variable length pipe is increased in length by effecting an increase in the mud pressure sufficient to open the check valve 28 to admit the mud under high pressure to the annular chamber 22.

This high mud pressure will then force the lesser reduced diameter portion 16 of the second pipe section 11 downwardly from the position shown in FIGURE 1 towards the position shown in FIGURE 2. Cessation of the mud pressure will result in the check valve 23 closing so that the members will be held in any particular telescoped position by the hydraulic fluid within the annular chamber 22. It should be noted that the second pipe section 11 may be extended to any position between the extreme positions shown in FIGURES 1 and 2, the relative movement ceasing when the mud pressure, controlled from the surface, is reduced. The expansion of the locking ring into the cavity 21 will serve as a stop at the extreme extended position as shown in FIGURE 3.

With the desired overall length provided, the drilling may continue and if the deflection rate now appears to be too small, the overall length may be decreased by increasing the weight exerted by the drill pipe string to an extent sufficient to cause the outlet check valve 24 to open. The second pipe section 11 will then contract with the first pipe section 10 until the added weight on the drill pipe string is reduced. The sloping inner walls of the cavity 21 will radially contract the lock ring during initial contracting movements.

Thus, either lengthening or shortening of the variable pipe sections can be effected from the surface without the necessity of pulling the pipe to substitute other pipe lengths.

In a straight drilling operation, several of the variable length pipe sections shown in FIGURE 1 may be inserted in series in the drill pipe string. As the drilling takes place, rather than insert a new drill pipe at the top of the string each time the bore has been drilled a distance equal to the length of the drill pipe as is convenional, the several variable length pipes within the pipe string may be lengthened by increasing the mud pressure as described, so that the drilling may continue. On the average, each drill bit will last for approximately 150 feet of drilling. One of the contemplated variable length drilling pipe sections of FIGURE 1 can effect an increase of length up to 170 feet so that no additional pipe need be inserted until the pipe is pulled to change the bit.

Thus, it is not necessary to have the crew normally provided for adding drill pipe on hand at the normally required given intervals but rather only at those times when the bit itself is being changed. Considerable time and labor is thus saved by the use of the variable length drilling pipe described.

From the foregoing description, it will be evident that the present invention has provided a greatly improved variable length pipe. When employed in drilling operations, the structure is not only controllable from the surface of the bore hole hydraulically, but in addition, sealing is efficiently effected as a consequence of the oval shaped cross sections of the telescoped sections and the avoidance of sharp corners and the like which would ordinarily destroy conventional sealing O-rings. Moreover, the desired rotational forces are communicated through the pipe section as a consequence of the non-circular cross sectional configuration.

It will be apparent to those skilled in the art that the present invention in its broadest aspects will find wide applications in fields other than oil drilling. For example, in road building equipment, farm equipment, and the like the variable length pipe could be used to extend or retract rotating members such as wheels on an axle shaft.

Modifications that thus fall clearly within the scope and spirit of this invention will occur to those skilled in the art. The variable length pipe is therefore not to be thought of as limited to the particular embodiment set forth in connection with drilling operations merely for illustrative purposes.

What is claimed is:

1. A variable length drilling pipe comprising, in combination: a first pipe section terminating in one end in a threaded coupling and including a reduced diameter portion extending to its other end; a sleeve secured at one end to said first pipe section and surrounding said reduced diameter portion to define between its inner wall and the exterior wall of said reduced diameter portion an annular chamber; a second pipe section having a lesser reduced diameter portion extending to one end and receivable within said annular chamber to telescope over said first-mentioned reduced diameter portion, and terminating at its other end in a threaded coupling; an inlet check valve means mounted to said first pipe section to connect the interior of said first pipe section to said annular chamber; an outlet check valve means mounted to said sleeve to connect said annular chamber to the exterior of said sleeve, and sealing means between said second pipe section and said sleeve and between said pipe section and said first mentioned reduced diameter portion, to seal said annular chamber whereby fluid introduced under pressure to said annular chamber through said inlet check valve hydraulically extends said second pipe section from said first pipe section to increase the overall length of said sections.

2. The subject matter of claim 1, in which the exterior of said first-mentioned reduced diameter portion follows a continuous smooth non-circular closed curve in cross-section and the interior of said lesser reduced diameter portion telescoped over said first pipe section follows a substantially congruent closed curve in cross-section, whereby said first and second pipe sections are locked against relative rotation with respect to each other.

3. The subject matter of claim 2, in which said closed curve is oval in shape.

4. The subject matter of claim 3, including a radially expandable stop ring keyed to the exterior of said lesser reduced diameter portion adjacent said one end thereof; and a stop collar secured to the other end of said sleeve and defining an internal annular cavity with a sloping wall flaring radially outwardly from said annular chamber in a direction towards said end, so that said stop ring is free to radially expand into said cavity when said lesser reduced diameter portion is telescoped outwardly from said annular chamber to an extent in which said stop ring is juxtaposed said cavity, whereby further telescoping in an outward direction is checked.

References Cited in the file of this patent

UNITED STATES PATENTS

| | | |
|---|---|---|
| 656,515 | Cassity | Aug. 21, 1900 |
| 1,617,659 | Whinnen | Feb. 15, 1927 |
| 2,177,601 | Smith | Oct. 24, 1939 |
| 2,668,682 | Dalton | Feb. 9, 1954 |
| 2,783,844 | Kanady | Mar. 5, 1957 |
| 2,838,283 | Simmonds et al. | June 10, 1958 |
| 2,915,290 | Petersen | Dec. 1, 1959 |